US008584953B2

(12) United States Patent
Zolotov

(10) Patent No.: US 8,584,953 B2
(45) Date of Patent: *Nov. 19, 2013

(54) SYSTEM AND METHOD FOR DECODING BARCODES NOT EASILY PERCEPTIBLE BY HUMAN VISION

(75) Inventor: Serguei Zolotov, Ottawa (CA)

(73) Assignee: Psion, Inc., Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/299,596

(22) Filed: Nov. 18, 2011

(65) Prior Publication Data
US 2012/0298753 A1 Nov. 29, 2012

Related U.S. Application Data

(63) Continuation-in-part of application No. 13/034,206, filed on Feb. 24, 2011, now Pat. No. 8,079,525.

(51) Int. Cl.
G06K 7/12 (2006.01)

(52) U.S. Cl.
USPC ............. 235/469; 235/462.04; 235/462.11

(58) Field of Classification Search
USPC .................. 235/469, 462.04, 462.11
See application file for complete search history.

(56) References Cited

U.S. PATENT DOCUMENTS

| 6,375,075 | B1 | 4/2002 | Ackley et al. |
| 6,832,725 | B2 | 12/2004 | Gardiner et al. |
| 7,028,901 | B2 | 4/2006 | Carlson |
| 8,079,525 | B1 * | 12/2011 | Zolotov ..................... 235/469 |
| 2003/0112471 | A1 | 6/2003 | Damera et al. |
| 2004/0199427 | A1 | 10/2004 | van der Loo |
| 2007/0138286 | A1 | 6/2007 | Kamijoh et al. |
| 2008/0265036 | A1 | 10/2008 | Wichers |
| 2010/0282851 | A1 | 11/2010 | Bulan et al. |
| 2011/0007967 | A1 | 1/2011 | Soderberg et al. |
| 2012/0000983 | A1 | 1/2012 | Bhagwan et al. |
| 2012/0118969 | A1 | 5/2012 | Zolotov |
| 2012/0145779 | A1 * | 6/2012 | Bietenbeck et al. .......... 235/375 |
| 2012/0312877 | A1 | 12/2012 | Zolotov |

OTHER PUBLICATIONS

MacAdam, David Lewis (May 1942). "Visual sensitivities to color differences in daylight" (abstract). Journal of the Optical Society of America 32 (5): 247-274.*
Wikipedia.org website, "Spectral sensitivity", http://en.wikipedia.org/wiki/Spectral_sensitivity, May 11, 2008.

(Continued)

Primary Examiner — Daniel Hess
(74) Attorney, Agent, or Firm — Randi L. Karpinia; Michael J. Giannetta

(57) ABSTRACT

A computing device and method for reading a barcode captured with a color image sensor is disclosed. The barcode can have features and background that have equal brightness and a substantially low chromacity deviation such that the barcode could not be easily perceptible and decoded with known greyscale decoding techniques. The method for reading the barcode includes receiving color image values for each pixel of a captured image of a target barcode from a color image sensor, determining chrominance values for each pixel from the color image values, detecting edges based on the chrominance values to generate an edge-detected image that is provided to a greyscale barcode decoder to decode the information in the target barcode. The chrominance values can be based on the blue and red difference components from the YUV image format, and the U and V values can be combined using color temperature information.

11 Claims, 4 Drawing Sheets

(56) References Cited

OTHER PUBLICATIONS

Non Final Office Action mailed on Mar. 26, 2012 in related U.S. Appl. No. 12/944,327, Serguei Zolotov, filed Nov. 11, 2010.
Final Office Action mailed on Oct. 2, 2012 in related U.S. Appl. No. 12/944,327, Serguei Zolotov, filed Nov. 11, 2010.
Notice of Allowance mailed on Aug. 19, 20112 in counterpart U.S. Appl. No. 13/034,206, Serguei Zolotov, filed Feb. 24, 2011.
Non Final Action mailed on Jan. 7, 2013 in counterpart U.S. Appl. No. 13/316,977, Serguei Zolotov, filed Dec. 12, 2011.
"Color Selection for Barcode Symbols," Bar Code Graphics, Inc., pp. 2, accessed at http://www.barcode-us.com/upc/upcColorChart.html, accessed on Jan. 23, 2013.

* cited by examiner

SYSTEM AND METHOD FOR DECODING BARCODES NOT EASILY PERCEPTIBLE BY HUMAN VISION

CROSS-REFERENCE TO RELATED APPLICATIONS

This application is a continuation-in-part application of application Ser. No. 13/034,206, filed Feb. 24, 2011, which is incorporated by reference herein.

FIELD

The present disclosure relates generally to decoding barcodes captured with a color image sensor. More particularly, the disclosure relates to processing barcodes captured with a color image sensor and processing the captured image to use a conventional greyscale image barcode decoder.

BACKGROUND

Barcode symbols provide a fast and accurate means of representing information about an object. Decoding or reading a barcode is accomplished by translating the patterns of the barcode, such as bars and spaces in linear barcodes or blocks or other features in a 2D barcode, into the corresponding numbers or characters. Barcodes are widely used for encoding information and tracking purposes in retail, shipping and industrial settings.

Historically, linear barcodes were optimized to be read by a laser scanner that sweeps a beam of light across the barcode, reading a slice of the pattern of the barcode. More recently, imagers (using image sensors such as CMOS or CCD devices) that capture a greyscale image have been used to read barcodes since they do not require moving parts like laser scanners and are also able to read 2D bar codes. However, image sensor technology is largely driven by the mass consumer camera market, rather than by barcode readers, where the trend is towards color image sensors with continually increasing resolutions and sensitivities delivered at lower costs. It may be advantageous for barcode reader technology to incorporate these color image sensors.

Often, only monochrome barcodes, typically black and white, are used due to their robustness in uncontrolled operating environments. These monochrome barcodes are typically printed on consumer products as a white rectangle with a black barcode thereon and can interfere with the design aesthetics of the packaging.

While color barcodes could be used to increase the aesthetic appeal, using a greater multitude of colors introduces errors that can negatively affect the robustness of barcode reading. Color barcodes pose difficult problems for either designing readable color barcodes or robust barcode readers that can decode these color barcodes. When the colors used for the features of the barcode and the background have a similar brightness, traditional greyscale-based barcode decoders and/or decoding techniques that rely on the brightness differences are not able to accurately decode these color barcodes.

Current barcode scanners or readers are designed for use with greyscale images. Designing barcode decoding algorithms that process color images directly can be computationally intensive and expensive to develop, in terms of labor, time, testing and validation.

SUMMARY

According to a first aspect, a method is provided for decoding a target barcode containing information represented by features on a background, the method comprising receiving color image values for pixels of a captured image of the target barcode from at least one color image sensor; determining a chrominance value for pixels of the captured image from the color image values; detecting edges based on chrominance value to generate an edge-detected image; and providing the edge-detected image to a greyscale barcode decoder to decode the information in the target barcode, wherein the features and background of the target barcode have a substantially low chromacity deviation and a similar luminosity. Preferably, determining chrominance values is based on a function of a blue difference component and a red difference component to emphasize the chromacity deviation of the features from the background. Preferably, the function is determined by U−rV where r is selected as the slope of a line perpendicular to a color temperature isotherm.

According to a second aspect, a computing device is provided for decoding a target barcode containing information represented by features on a background, the features and background of the target barcode having a substantially low chromacity deviation and a similar luminosity, the computing device comprising at least one color image sensor for providing color image values pixels of a captured image of the target barcode; a greyscale barcode decoder capable of decoding barcode information from greyscale images; a memory for storing program code; a processor coupled to the memory that executes the program code to configure the processor to determine a chrominance value for pixels of the captured image from the color image values, detect edges based on chrominance value to generate an edge-detected image; and provide the edge-detected image to a greyscale barcode decoder to decode the information in the target barcode. Preferably, determining chrominance values is based on a function of a blue difference component and a red difference component to emphasize the chromacity deviation of the features from the background. Preferably, the function is determined by U−rV where r is selected as the slope of a line perpendicular to a color temperature isotherm.

According to a third aspect, a barcode is provided to represent encoded information, the barcode comprising a background; features printed on the background to encode information, wherein the features and background of the barcode have a substantially low chromacity deviation and a similar luminosity. Preferably, the chromacity deviation and luminosity between the features and background are not easily perceptible by human vision. Preferably, the chromacity deviation between the feature and background of the target barcode are both within a MacAdam ellipse on a color chart.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

The embodiments of the systems, devices and methods described herein may be implemented in hardware or software, or a combination of both. Some of the embodiments described herein may be implemented in computer programs executing on programmable computers, each computer comprising at least one processor, a computer memory (including volatile and non-volatile memory), at least one input device, and at least one output device. For example, and without limitation, the programmable computer can be a mobile computing device having a processor, a color image sensor for capturing barcode images, and at least one network interface. Program code may be executed by the processor to operate on input data, such as the captured barcode image, to perform the functions described herein and generate output data.

Figure 1:
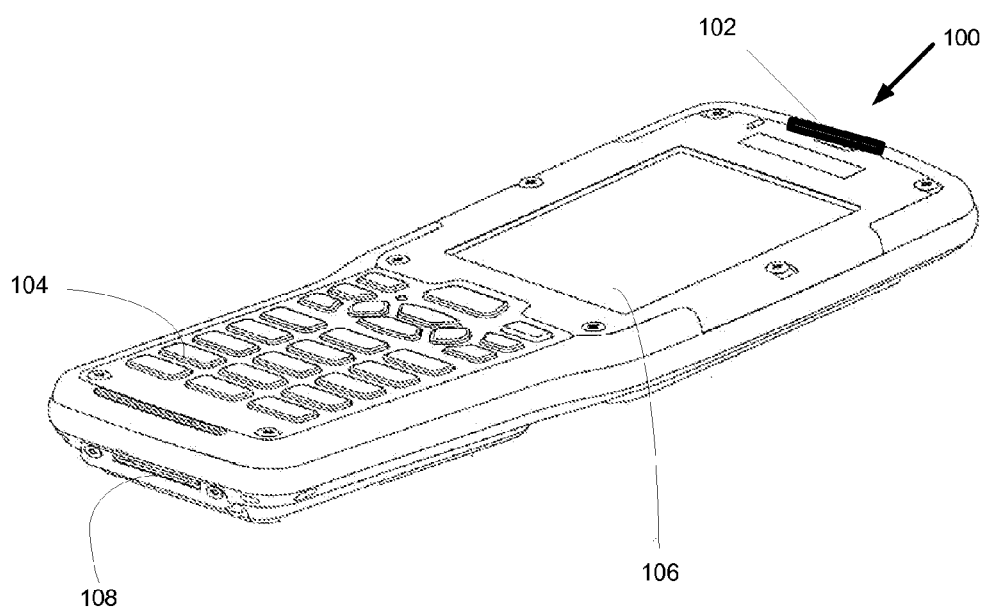
FIG. 1 is a perspective view of a computing device having a barcode scanner for optical barcode scanning.

Reference is first made to FIG. 1, where a computing device 100, having a barcode scanner 102 for optical barcode scanning functionality, is shown. Computing device 100 can be any of a wide range of digital devices including, without limitation, devices which generate digital information, such as computer terminals, RFID readers, optical scanning devices, including dedicated barcode scanning devices, digital photo and document scanners. Computing device 100 can be implemented as either a fixed device, such as those used in retail sales, or a portable device, such as a mobile computer, mobile phone, handheld terminal, digital camera, scanner or other electronic device configured to capture and decode barcode images. Barcode scanner 102, as described in further detail below, may comprise a set of hardware, firmware, and system software, employed in any suitable combination in order to capture an image of a barcode using a color image sensor.

Computing device 100 can further include a keyboard 104 for user input, a display screen 106, and an expansion port 108. An exemplary expansion port 108 can include a Universal Serial Bus (USB) port or other similar expansion port for coupling compatible peripheral devices such as, but not limited to, a communication and synchronization cradle for computing device 100.

As used herein, the term barcode refers to an optical machine-readable representation of information. Typically, barcodes encode information in the widths and the spacing of parallel lines, and may be referred to as linear or 1D (1 dimensional) barcodes or symbologies. Barcodes can also encode information in patterns of squares, dots, hexagons and other geometric shapes or symbols within images termed 2D (2 dimensional) matrix codes or symbologies. Typically, although 2D systems use symbols other than bars, they are generally referred to as barcodes as well. Accordingly, the barcode images discussed herein for use with barcode scanner 102 can refer to either 1D or 2D barcodes. As will be described, the barcodes can be read by optical scanners or readers referred to collectively as barcode scanners 102. As used herein, the objects used to encode the information, such as bars, squares, etc., are referred to as features and these features are printed on a background. With conventional monochromatic barcodes, the features are typically printed in black on a white background. With color barcodes, the features can be any number of colors, as can the background, but the features will be printed such that the features are distinguishable from the background color. Within this restriction, the actual colors of the features and background may be selected based on aesthetic reasons.

Figure 2:
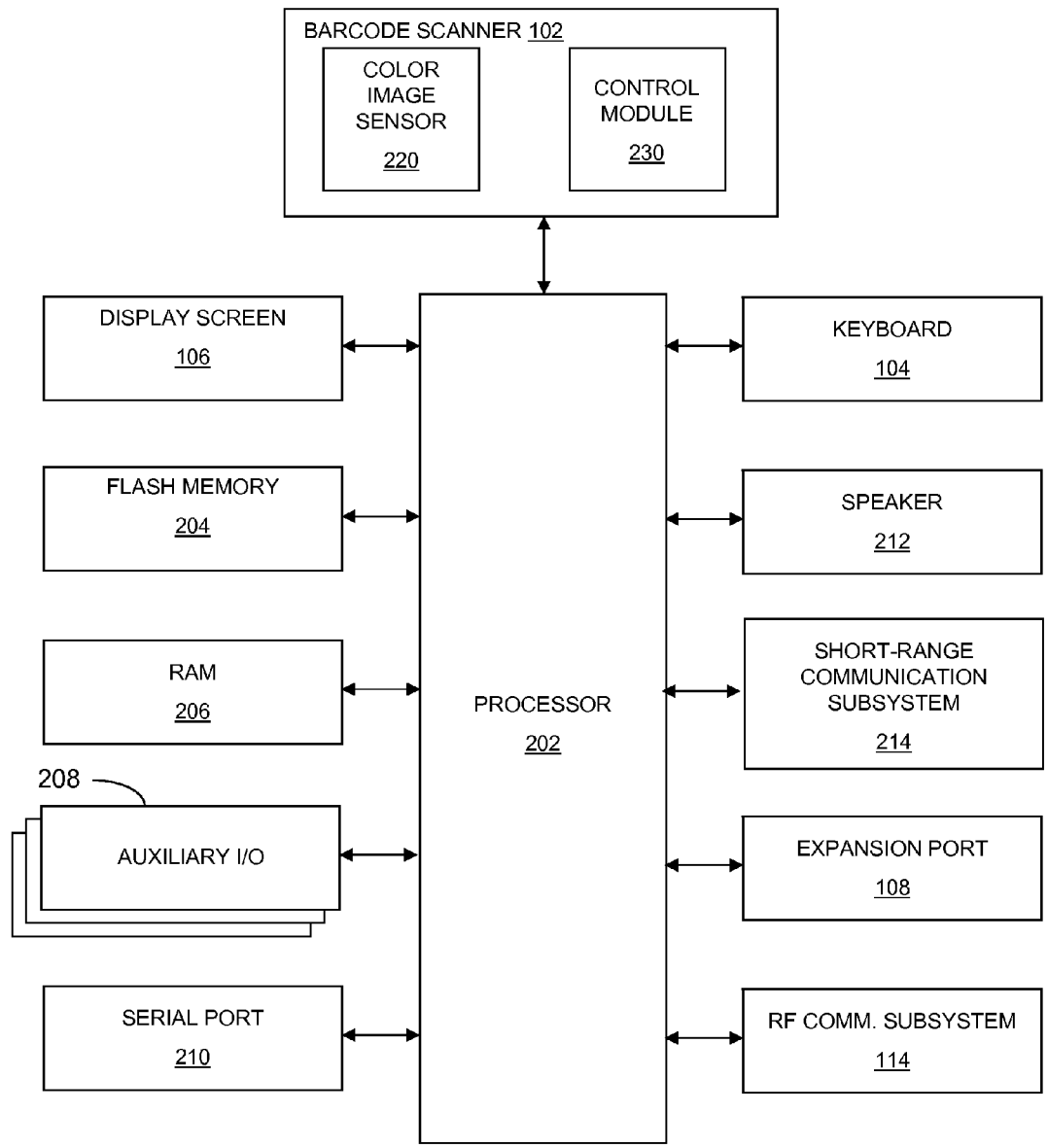
FIG. 2 is a block diagram illustrating an exemplary architecture of the functional subsystems of the computing device of FIG. 1.

Referring now to FIG. 2, a block diagram 200 is shown illustrating an exemplary system architecture of the functional subsystems of computing device 100. Computing device 100 comprises a processor 202 that controls general operation of computing device 100. Processor 202 interacts with functional device subsystems, which can include subsystems such as display screen 106, flash memory 204, random access memory (RAM) 206, auxiliary input/output (I/O) subsystems 208, serial port 210, keyboard 104, speaker 212, short-range communications subsystem 214, such as Bluetooth™ for example, and expansion port 108. Computing device 100 can include a power source such as battery module 216 that can be removable and replaceable from computing device 100. While the illustrated embodiment of computing device 100 includes the functional subsystems described above, it will be apparent to those of skill in the art that device 100 can omit some of these susbsystems and/or can include additional subsystems as required to meet an intended field of use for computing device 100.

Computing device 100, which can be a handheld device, can have the capability of communicating at least data, and possibly any of data, audio and voice communications, to and from computing device 100, as well as data acquisition sources within a communication network. Computing device 100 can include wired or wireless communication capability. In the wireless configuration, the computing device 100 typically includes radio frequency (RF) communication subsystem 218, which includes a receiver, a transmitter, and associated components, such as one or more embedded or internal antennae, and a processing module such as a digital signal processor (DSP) or the like. As will be apparent to those skilled in field of communications, the particular design of RF communication subsystem 218 depends on the specific communication networks in which computing device 100 is intended to operate, and can include communication functionalities such as radio-frequency identification (RFID), Wi-Fi WLAN based on IEEE 802.11 standards, Zigbee, Z-Wave, GSM EDGE, 1 EVDO, HSPDA, and the like.

Still with regard to FIG. 2, operating system software that is executed by processor 202 can be stored in a persistent storage such as flash memory 204, or alternatively, in other read-only memory (ROM) or similar storage elements (not shown). Those skilled in the art will appreciate that the operating system, specific device applications, or parts thereof, may be temporarily loaded into a volatile store such as RAM 206.

Processor 202, in addition to its operating system functions, enables execution of software applications on computing device 100. A predetermined set of applications, which control basic device operations, or even more customized, advanced device operations, may be installed on computing device 100 during its manufacture, such as during the components configuration process described herein.

Display screen 106 of computing device 100 may be used to visually present a software application's graphical user interface (GUI) to a user via display screen 106. Display screen 106 can employ a touch screen display, in which case the user can manipulate application data by modifying information on the GUI using direct touches by a finger or stylus. Depending on the type of computing device 100, the user may have access to other types of input devices, such as, for example, a scroll wheel, trackball or light pen.

A graphical user interface presented on display screen 106 of computing device 100 may enable an operator or administrator to interact therewith. It further contemplated that computing device 100 may be communicatively coupled to a remotely located database (not shown).

Computing device 100 further comprises barcode scanner 102. Barcode scanner 102 can comprise any suitable combination of software, firmware and hardware to implement scanning of a target color barcode with a color image sensor 220 via greyscale barcode decoding technique.

Barcode scanner 102 comprises a color image sensor 220 and a control module 230. Control module 230 is connected to color image sensor 220 and can be implemented as an integrated circuit, either a discrete unit or integrated with image sensor 220 or processor 202, or alternatively, control module 230 can be implemented as software executing on processor 202. Image sensor 220 can further include a light source and a lens (not shown). The light source and lens can be controlled by control module 230. The lens can also be adjusted by control module 230 to auto-focus on the target barcode. Color image sensor 220 can be part of a camera, such as a digital still camera or a video camera.

It is noted that although a single image sensor 220 is discussed herein, color image sensor 220 may comprise a number of sensors as may be needed to capture and process an image of a target barcode. For example, in one embodiment, different color image sensors 220 may be used to process 1D, or 2D barcodes respectively. In another embodiment, a number of color image sensors 220 can be used simultaneously to scan the target barcode and provide RGB values and/or YUV values as desired. In yet another embodiment, a number of color image sensors 220 may be used such that each may be better suited for providing a particular type of color schemes (e.g. RGB or YUV or Bayer format as predefined) of the target barcode.

Color image sensor 220 captures a particular barcode by illuminating the target barcode and measuring the intensity of the light reflected back. The light source can approximate white light or be a non-white light source such as a colored LED. A particular color may be selected when there is a priori knowledge of the target barcode in order to enhance contrast. Colored LEDs may also provide improved output per power.

Color image sensor 220 typically includes a color filter array that covers the sensor elements, so that each sensor element is filtered to record only a single color. One such filter array is a Bayer filter that uses a weighted pattern of red, green and blue filter elements. The raw output in the Bayer filter format must then be processed by a de-mosaicing algorithm to interpret a set of red, green and blue values for each picture element, or pixel, of the captured image. The intensity of red, green and blue values for each pixel can be encoded into an RGB format image.

Conversion from raw output in the Bayer filter format can be performed by bar code scanner 102 implementing the de-mosaicing algorithm. Color image sensor 220 can output the captured image in a number of different formats such as, for example, raw Bayer filter format, RGB, CMY, CMYK, HSC, YUV, or a processed image, including, but not limited to, JPEG. Barcode scanner 102 can also convert the image format from the raw Bayer filter format to any one of the aforementioned formats.

In an RGB format image, the color of each pixel is represented by the amount of red, green and blue colors that it includes. For example, within image formats such as BMP, JPEG and TIFF formats, each pixel of the image is represented with values for each of red, green and blue quantities. As is known in the art, other color spaces can also be used, such as, for example, the CMYK color space that uses four colors to define the color of each pixel.

Typically, a YUV model defines a color space in terms of one of a luminance, or luma, component (e.g. representing the brightness) as Y and chrominance (color) components as U and V. Luminance refers to perceptual brightness while "luma" is an electronic (voltage of display) brightness. The Y value described herein can refer to either one of luminance or luma values. Chrominance is usually represented as two color-difference components: $U=B-Y$ (blue–luma) and $V=R-Y$ (red–luma). Each of these color difference components may have applied scaling factors and offsets.

Figure 3:
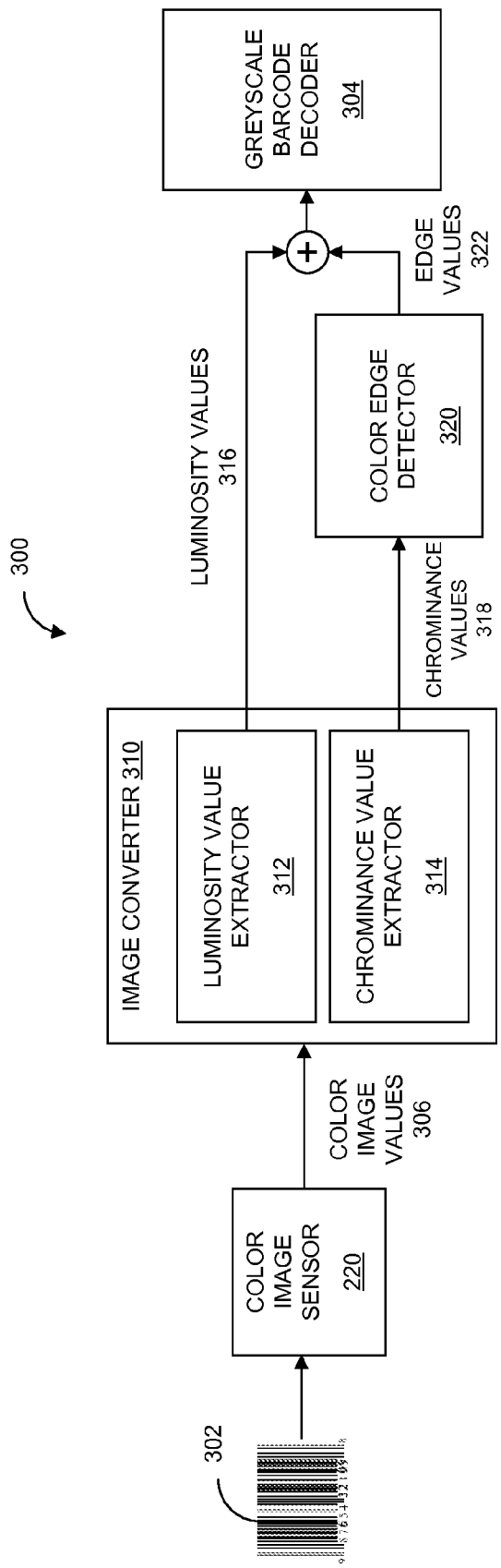
FIG. 3 is a block diagram of a system for decoding information captured from a target barcode with a color image sensor using a greyscale barcode decoder.

Referring now to FIG. 3, a block diagram is shown of a system 300 for decoding information from target barcode 302 using a greyscale barcode decoder 304. Each of the blocks of system 300 represents a functional block of system 300 and can be implemented in either hardware or software, and can be implemented, either in whole or in part, in bar code scanner 102. Functional blocks of system 300 can also be implemented in software executing on processor 202 of computing device 100.

As described above, color image sensor 220 captures an image of target barcode 302 from light reflected from target barcode 302 and captured by sensor elements of color image sensor 220. Target barcode 302 can be either color, or black and white. Color target barcodes 302 can have features and background in colors with similar brightness. Color image sensor 220 provides color image values 306 to image converter 310. Color image values 306 output from color image sensor 220 can be in any number of formats that include, but are not limited to, RGB, YUV, raw Bayer filter format, or other formats noted above. Color image values 306 can comprise an array, vector, matrix and/or a data stream of values representing the color space data for each pixel captured by color image sensor 220.

Image converter 310 converts color image values 306 of the captured image of target barcode 302 to output luminosity values and chrominance values. In an embodiment where color image sensor 220 provides RGB format color image values 306, image converter 310 can perform an RGB format to YUV format conversion to generate YUV values representing the captured image of target barcode 302. Various suitable methods for converting RGB format image values to YUV format image values will be apparent to those skilled in the art. The luminosity value can be calculated as a weighted sum of each of the red, green, and blue components of each pixel. As described above with respect to the YUV model, chrominance values are calculated as color difference values that are computed as scaled differences between the luminosity value and the blue and red values for each pixel. If color image values 306 are in another format, image converter 310 can convert color image values to RGB format values prior to converting to luminosity values and chrominance values, or image converter 310 converts color image values 306 from their native format directly to luminosity values and chrominance values.

Color image sensor 220 can also provide raw Bayer filter format color image values 306 to image converter 310.

Accordingly, in such an embodiment, image converter 310 is configured to obtain pixel color information from the Bayer filter format to RGB color model format as will be understood by a person skilled in the art. Once the RGB color model format image values are obtained, the values can be converted to YUV image format values.

Luminosity value extractor 312 and chrominance value extractor 314 extract luminosity values 316 and chrominance values 318, respectively, for each pixel. Luminosity value extractor 312 can extract the Y values from the YUV image format values to provide luminosity values 316 for each pixel in order to provide a greyscale image based on the captured color image. The greyscale image, represented by luminosity values 316, is then provided to greyscale barcode decoder 304 to decode the information from target barcode 302.

If target barcode 302 uses a black and white or greyscale to represent the features and background of target barcode 302, greyscale barcode decoder 304 can likely decode information in target barcode 302. However, if target barcode 302 is uses a color representation that uses colors with similar luminosity (brightness) values, the luminosity values may not be sufficient to decode the information from the features of target barcode 302. For example, yellow can nearly be as bright as white, such that if target barcode 302 was implemented using yellow colored features on a white background, the greyscale image comprised of luminosity values 316 would obscure the features and background of target barcode 302. In these cases, luminosity values 316 alone are insufficient to decode information from target barcode 302 and chrominance values 318 from chrominance value extractor 314 are used.

Chrominance value extractor 314 can extract the blue difference components and red difference components (i.e. the U and V values) from the YUV image format values to provide chrominance values 318 for each pixel. Chrominance values 318 can be provided as only a single color difference component (i.e. either the U or V value for each pixel) or a combination of color difference components. The combination of the color difference components can use a weighted sum or difference of the U and V components. The weighting of the components in the combination can be based on information about color image values 306 of the captured image, such as color temperature.

Color temperature information can be used to distinguish image features from the background. Chrominance value extractor 314 can provide chrominance values 318 for each pixel by applying the equation: $f(U,V)$=constant, where the function $f$ is parallel to a color temperature gradient on a UV color chart. The form of function $f$ may be chosen for computational efficiency. For example, function $f$ can be selected as $U-rV$, where r is a constant that can be chosen and adjusted from image samples. When function $f$ is selected as $U-rV$, the resultant chrominance values 318 thus have a reduced red difference component (i.e. V value) according to the color temperature of the image. Thus, the color difference between features and the background of target barcode 302 can be emphasized. Chrominance values 318 provides a color differential image that reveals color space differences in the captured image.

The value of r is selected so that $U-rV$=constant is a line that corresponds to a color temperature isotherm line in a UV color space chart, such as the CIE 1960 color space, where the color temperature isotherm is perpendicular to the color temperature gradient. For computational simplicity, the color temperature gradient is approximated as a line in order to determine r for the $U-rV$=constant line that is perpendicular to the color temperature gradient.

As the algorithm of chrominance value extractor 314 processes images, r can be adjusted to achieve better performance. For warmer (reddish) images, r can be adjusted lower, and for colder (bluish) images, r can be adjusted higher. Captured images can be preprocessed using picture samples to adjust r for future scans. An r value equal to 1 corresponds to a color temperature of ~6500K, where ~5500K corresponds to the color temperature of sun light.

Chrominance values 318 are then provided to color edge detector 320 that determines color boundaries of the features of the target barcode 302 to generate edge values 322. Color edge detector 320 applies an edge detection algorithm to the chrominance values 318 in order to detect the color difference gradient between the features and background of target barcode 302. Any number of edge detection algorithms can be used, including, but not limited to, thresholding using a dynamic or static threshold, first and second order differential techniques, median, and thinning. Thresholding techniques may be preferable for simplicity and speed of execution.

Edge values 322 provided by color edge detector 320 define a vector image of target barcode 302 that defines the edges of features of target barcode 302. Edge values 322 can be combined with luminosity values 316 to provide pixel values to greyscale barcode decoder 304 in order to decode the information from target barcode 302. Alternatively, greyscale barcode decoder 304 may be provided with the edge values 322 to decode information from target barcode 302.

In yet another alternative, edge values 322 and luminosity values 316 can be combined by greyscale barcode decoder 304 as required to decode information in target barcode 302. For example, greyscale barcode decoder 304 can apply the edge values 322 to the greyscale image defined by the luminosity values 316 to correct the captured image in order to decode information in target barcode 302. That is, greyscale barcode decoder 304 is configured to combine the received signals (e.g. luminosity values 316 and edge values 322) received from the image converter 310 and color edge detector 320 into a series of characters that represent the information encoded in target barcode 302.

Greyscale barcode decoder 304 can comprise any suitable combination of software, firmware and hardware for implementing greyscale decoding that is based on processing grey scale images. Greyscale barcode decoder 304 can comprise any suitable standard barcode decoder adapted for use with greyscale images as will be understood by a person skilled in the art.

As will now be apparent based on the discussion above, computing device 100 uses color image sensor 220 to capture an image of target barcode 302 to acquire color image values 306 representing target barcode 302. These color image values 306 are then processed by image converter 310 and color edge detector 320 to obtain luminosity values 316 representing a greyscale image that is combined with edge values 322 from color edge detector 320, where the resulting combined values can be processed in a substantially conventional manner by any suitable greyscale barcode decoder 304. By converting the color image values 306 to a representation that can be processed by a greyscale barcode decoder, the need for a computationally expensive and/or difficult to implement color barcode decoder is eliminated, and color barcodes where the features and background have a similar brightness can be decoded.

As noted above, color temperature information can be used to distinguish between the features and background of target barcode 302. One example was provided of selecting a function $f$ as $U-rV$, where r is selected so that $U-rV$=constant is a line that corresponds to a color temperature isotherm line in a UV color space. Selecting r as the slope of a color temperature isotherm is preferably suited to cases where the chromacity deviation between the features and background of target barcode 302 are easily perceptible. For example, target barcode 302 could be implemented with red features on a green background where the red and the green used have different chromacity but have similar luminosity.

Target barcode 302 could also be designed where the features and background have similar luminosity and a substantially low chromacity deviation so that target barcode 302 is not easily perceptible to human vision. Alternatively, target barcode 302 could be designed so that the chromacity deviation is imperceptible to human vision. This type of design can be used to conceal target barcode 302 on packaging or within a photograph. As an example of possible applications, target barcode 302 could be concealed on a sign or in a magazine advertisement that when captured by image sensor 220 of computing device 100 could provide the user with more information related to the sign or advertisement.

A substantially low chromacity deviation between the features and background may not be easily perceptible or imperceptible to human vision, but can still be detected by color image sensor 220. Modern image sensors can theoretically define 16.7 million colors. This is a mathematical figure related to 8-bits (which can define 256 tones) for each color channel (red, green and blue). When the three channels are combined, the image will have a maximum of 24-bit color definition (capable of defining 16.7 million nuances). The human eye cannot distinguish all colors, and the industry has set standards for "color space", which is the boundaries for the colors used by color image sensors and digital printing.

A RAW image from color image sensor 220 typically uses 10 or more bits to define the color, which results in even more possible colors that color image sensor 220 could possibly detect. Despite this, color sensitivity of color image sensor 220 is defined as the number of distinguishable colors up to noise. If the difference between two colors is higher than their corresponding noise, they are considered to be a distinguishable color by color image sensor 220. Color image sensors are constantly improving and trending towards cheaper sensors with improved color sensitivity.

Figure 4:
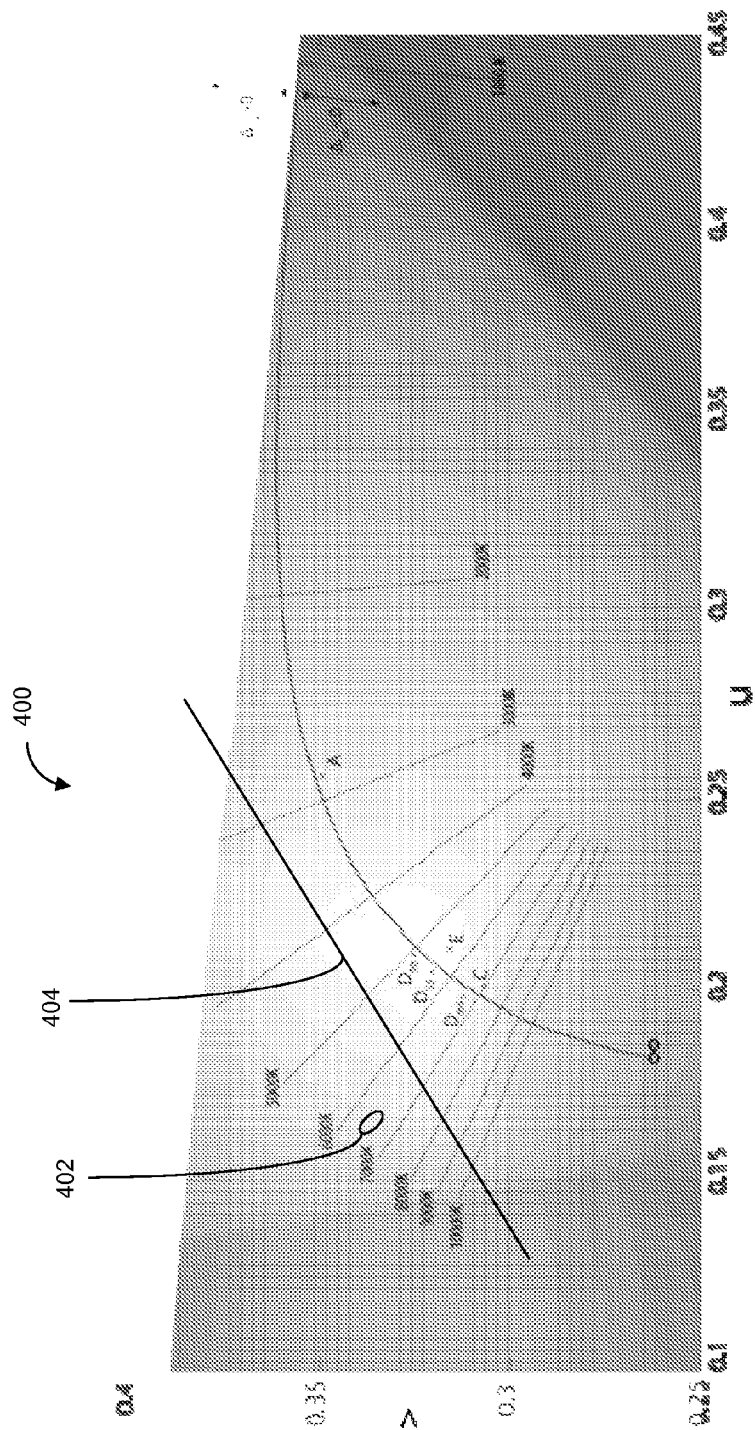
FIG. 4 is a color space chart illustrating color temperature isotherms and a MacAdam ellipse.

Human color vision has difficulty perceiving a difference in chromacity or hue when the wavelength varies from about 1 nm in the blue-green and yellow wavelengths, to 10 nm and more in the red and blue wavelengths. Human vision is more sensitive in the middle of the visible spectrum than at the edges, and is thus able to more easily perceive different chromacity in green colors. Using the edges of the visible spectrum (i.e. red and blue wavelengths) it can be easier to create target barcode 302 to not be easily perceptible or imperceptible to human vision. In the study of color vision, there are elliptical regions on a chromacity diagram which contains colors which are indistinguishable to the average human eye from the color at the centre of the ellipse. These regions are referred to as MacAdam ellipses, and an example MacAdam ellipse 402 is illustrated in FIG. 4. Colors that are perceived as identical to the reference color at the center of the ellipse lie within the ellipse.

Though the human eye can distinguish up to a few hundred hues, when those pure spectral colors are mixed together or diluted with white light, the number of distinguishable chromaticities can be much greater. Human vision is more color sensitive in high illumination environments (photopic vision) versus lower light environments (scoptic vision). Color image sensor 220 can be capable of detecting a much larger number of distinguishable chromaticities than the human eye. Color image sensor 220 is similarly more color sensitive when more light is reflected back from the object of interest, and using a flash or other light source can increase the dynamic range of chromacities in the captured image from color image sensor 220. Color image sensor 220 can therefore be used to detect target barcodes 302 that may not be easily perceptible or are imperceptible to human vision due to a similar luminosity and low chromatic deviation between the features and background.

Referring now to FIG. 4, shown is a color space chart 400 illustrating a number of color temperature isothermal lines that are perpendicular to the Planckian locus. The color space chart ignores brightness (luminosity) and is a chromacity space that plots u and v chromacity values. The Planckian locus is the path that the color of an incandescent black body would take in a particular chromaticity space as the blackbody temperature changes. It goes from deep red at low temperatures through orange, yellowish white, white, and finally bluish white at very high temperatures.

Target barcode 302 can be designed to not be easily perceptible to human vision by selecting chromacities for the features and background to be imperceptible or not easily perceptible by human vision. For example, chromacities can be selected to be within a MacAdam ellipse, and preferably to be along the major axis of the MacAdam ellipse. Selecting r so that $U-rV=$constant is a line that corresponds to a color temperature isotherm line in a UV color space may not yield optimal results for target barcodes 302 that are not easily perceptible.

When the features and background of target barcode 302 have a substantially low chromacity deviation to be imperceptible or not easily perceptible by human vision it is preferable to select r to correspond to a line that is perpendicular to a color temperature isotherm (or positioned along the minor axis of the MacAdams ellipse corresponding to the chromacities of the features and background of target barcode 302). In FIG. 4, normal line 404 has a slope r and is shown perpendicular to the 4000 Kelvin color isotherm. By selecting r to have a slope perpendicular to a color isotherm, chrominance values 308 can emphasize the chromacity deviation between the features and background of target barcode 302. MacAdam ellipse 402 that contains indistinguishable colors from the color at the centre of the ellipse further illustrates this principle. The minor axis of MacAdam ellipse 402 is perpendicular to the nearby color isotherms indicating that there is greater color distinguishability in the direction perpendicular to the color isotherms.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

The invention claimed is:

1. A method for decoding a target barcode containing information represented by features on a background of the target barcode, the method comprising:

receiving color image values for pixels of a captured image of the target barcode from at least one color image sensor;

determining a chrominance value for pixels of the captured image from the color image values;

detecting edges based on chrominance value to generate an edge-detected image; and providing the edge-detected image to a greyscale barcode decoder to decode the information in the target barcode, wherein the features and background of the target barcode have a substantially low chromacity deviation and a similar luminosity.

2. The method of claim 1, wherein determining chrominance values is based on a function of a blue difference component and a red difference component to emphasize the chromacity deviation of the features from the background.

3. The method of claim 2, wherein the function is determined by the equation U−rV, where U represents the blue difference component, V represents the red difference component, and r is a constant determined based on color temperature.

4. The method of claim 3, wherein r is selected as the slope of line perpendicular to a color temperature isotherm.

5. The method of claim 1, wherein the chromacity deviation and luminosity between the features and background are not easily perceptible by human vision.

6. The method of claim 5, wherein the chromacity deviation of the feature and background of the target barcode are both within a MacAdam ellipse on a color chart.

7. The method of claim 6, wherein the chromacity deviation between the features and background are any one of less than 1 nm in the blue-green and yellow wavelengths and less than 10 nm in the red and blue wavelengths.

8. A computing device for decoding a target barcode containing information represented by features on a background, the features and background of the target barcode having a substantially low chromacity deviation and a similar luminosity, the computing device comprising:
- at least one color image sensor for providing color image values pixels of a captured image of the target barcode;
- a greyscale barcode decoder capable of decoding barcode information from greyscale images;
- a memory for storing program code;
- a processor coupled to the memory that executes the program code to configure the processor to determine a chrominance value for pixels of the captured image from the color image values, detect edges based on chrominance value to generate an edge-detected image; and provide the edge-detected image to a greyscale barcode decoder to decode the information in the target barcode.

9. The computing device of claim 8, wherein determining the chrominance values is based on a function of a blue difference component and a red difference component to emphasize the chromacity deviation of the features from the background.

10. The computing device of claim 9, wherein the function is determined by the equation U−rV, where U represents the blue difference component, V represents the red difference component, and r is a constant determined based on color temperature.

11. The computing device of claim 10, wherein r is selected as the slope of line perpendicular to a color temperature isotherm.

* * * * *